Patented Feb. 19, 1952

2,586,407

UNITED STATES PATENT OFFICE 2,586,407

PROCESS FOR THE EXTRACTION OF PECTIC SUBSTANCES FROM VEGETABLE MATTER

Conrad Lawrence Walsh and Basil Albert Adams, Bulstrode, Gerrards Cross, England, assignors to A. S. P. Chemical Company Limited, Bulstrode, Gerrards Cross, England, a British company No Drawing. Application April 7, 1949, Serial No. 86,124. In Great Britain April 13, 1948

6 Claims. (Cl. 260—209.5)

This invention relates to an improved process for extraction of pectic substances from vegetable matter.

The usual method of extracting pectic substances from vegetable matter is to employ a solution of an alkali or ammonia salt having anions which will form an insoluble salt with the calcium ions linked to the pectic substances. This method of extraction can only be effected with hot solutions to obtain good yields of pectic substances. However, it is known that by pretreating the vegetable matter with an acid whereby the calcium linkages are replaced by hydrogen ions, the pectic substances can be extracted with cold solutions of alkali or ammonia bases or basic salts but the quantities of acids hitherto employed for this purpose have been excessive and as the processes previously described resort to agitation of the vegetable matter, the sol obtained is normally cloudy due to suspended particles and often discoloured.

We have found that the removal of the calcium ions from the vegetable matter may be effected by passing a very dilute solution of an acid e. g. a 0.5% to 1% solution (by weight) of commercial concentrated hydrochloric acid (35% HCl), through vegetable matter in the form of a column or a bed. The process therefore would appear to be one analogous to the passage of an acid solution through a column of cation-exchange material having exchangeable calcium ions.

Furthermore we have found that by passing a solution of an alkali or ammonium base or basic salt through a column or bed of the vegetable matter after treatment with a dilute solution of an acid, neutralisation of the acid of the pectic substance is effected to form an alkali or ammonium salt of the pectic substances as a sol free from suspended matter.

The object of the present invention is to render the process of extraction of pectic substances from vegetable matter more rapid and economical whilst conducting the reactions in a cold state and to provide a sol that is almost water white in character, which in sequence gives a pectic gel of enhanced quality and appearance.

The invention consists in extracting pectic substances from vegetable matter, firstly by passing water through a column or bed of the vegetable matter to remove the water soluble material followed by the passage of a weak solution of an acid of a concentration of not greater than 0.1% to replace the calcium ions linked with the pectic substances with hydrogen ions or alternatively the vegetable matter may be treated directly by the passage of the solution of acid to remove water soluble material and to replace the calcium ions with hydrogen ions, and secondly, passing water through the vegetable matter to wash it substantially free from acid, and thirdly extracting the acid pectate substances so formed in the vegetable matter by passing through the column or bed a solution of a basic alkali or ammonium hydroxide, carbonate or bicarbonate to neutralise the insoluble acid pectic substance and to yield a sol of the basic alkali or ammonium salt of the pectic substance.

The invention also includes the recovery of the extracted pectic substances by precipitating a gel from the relatively dilute sol of the alkali or ammonia salt of the pectic substance by the addition of a salt which forms an insoluble pectate gel or with an acid which forms a pectic acid or by salting out a gel of an alkali or ammonia salt of pectic substance by the addition of a concentrated solution or of crystals of an alkali or ammonia salt followed by the steps of de-watering by screening or filtration or both, and washing with water, rescreening and filtering if necessary followed by the steps of pressing in an hydraulic press, and then drying, grinding and sieving the resulting material to yield an acid or a salt of the pectic substance.

The vegetable matter to be used as sources of the pectic substances may be whole plants, or parts of plants such as roots, stems, leaves, flowers, fruits, seeds, or portions of any part or parts of these plants which contain sufficient quantities of pectic substances to render their extraction economical. Such vegetable matter may or may not have been previously processed for the removal of its fibre, wax, chlorophyll, hydroxy acid, glucoside sugar, saponin or other constituents prior to the extraction of pectic substances.

The calcium and magnesium salts in plant flesh occurring as phosphates or in combination with hydroxy acids are soluble in water, whilst calcium pectate and magnesium pectate are not soluble in water.

Should such prior treatment or treatments involve inter alia the employment of water, which would remove water soluble constituents including calcium and magnesium compounds such as calcium phosphate, calcium malate and kindred salts of the hydroxy acids, it is not essential to include the stage of passing water through a column or bed of the vegetable matter prior to the passage of an aqueous solution of an acid. The main object of initial water treatment is to remove the soluble calcium and magnesium ions or at least to remove a large proportion of them.

The passage of the solution of an acid, e. g. hydrochloric or sulphuric acid effects by ion-exchange the replacement of calcium, magnesium and other ions with the hydrogen ions contained in the acid and at the same time other constituents are removed from the vegetable matter, for example phosphates, oxalates and hydroxy acids. The objective of this treatment is to replace the calcium ions linked with the pectic substances with hydrogen ions to yield an acid of the pectic substances.

On treating the vegetable matter by the passage of a solution of an alkali or ammonia hydroxide, carbonate, or bicarbonate, the acid of the pectate substance is neutralised to form an alkali or ammonia salt of the pectic substance which is soluble in water, or in the solution of the alkali or ammonium hydroxide, carbonate or bicarbonate.

The resulting sol of the salt of the pectic substance is then treated with an acid to precipitate a pectic acid gel or is treated with a solution of a salt such as calcium chloride or copper sulphate to form an insoluble gel of the metal salt of the pectic substance or the sol may be treated with a concentrated solution, or the crystals of, an alkali or ammonia salt to salt out sodium or ammonium pectate.

The resulting precipitated gel is de-watered by passage through metal gauze screens or by filtration or both and is then further dewatered by pressing followed by the steps of drying, grinding and sieving.

Alternatively, the pressed pectic acid may have mixed with it a saturated solution or solid base or basic salt of an alkali or alkaline earth, ammonia or magnesia to form the corresponding salt of the pectic substances which is then dried, ground and sieved.

One of the advantages of this process is that by replacing calcium and magnesium ions with hydrogen ions in the vegetable matter, the subsequent processes by treating the vegetable matter by the passage of a solution of an alkali or ammonia hydroxide, base or basic salt through a column or ion exchange bed of the vegetable matter allows of the extraction in temperate climates being carried out in the cold and thus the process is rendered much more economical. Furthermore, the products obtained by this process are superior in their gelling properties.

Another advantage of this process is that by passing the alkaline solution through a column or bed of the vegetable matter the resulting liquor is clear and contains no finely divided suspended matter and in consequence yields a product which when re-dissolved in water yields a clear sol.

In order that the process shall be more fully understood reference is made to the following examples:

*Example 1.*—Employing sisal flesh i. e. the fleshy part of the leaf from which the fibre is separated by any effective known process, one part by weight is placed in an extraction vessel and is treated as a first stage by passing through the bed 20 parts of water to effect the removal of the water soluble material including calcium, potassium and magnesium salts.

10 parts of a solution of hydrochloric acid having a concentration of 1% (by weight) of commercial concentrated hydrochloric acid is then passed through the bed of sisal flesh to effect the removal of calcium ions linked with the pectic substances by replacement with hydrogen ions. The bed is then washed with water to free it substantially from acid.

This treatment is followed by the passage of 20 parts of a 0.5% solution of sodium carbonate to effect the neutralisation of the insoluble acid pectic substances to form the soluble sodium pectate.

The sodium pectate sol so produced is free from suspended matter and on the addition of 0.25 part of concentrated commercial hydrochloric acid a clear gel of a pectic acid is precipitated.

The gel is de-watered firstly by screening through a stainless steel gauze and the partially de-watered gel is transferred to a hydraulic press and is then further de-watered by pressing. The pressed pectic acid gel is treated with a hot saturated solution of sodium bicarbonate to effect the neutralisation of the pectic acid and to form sodium pectate.

The sodium pectate is placed in a dryer and dried at a temperature of about 60° C. The dried material is then ground and sieved. The yield is from 9 to 10% of the weight of sisal flesh.

*Example 2.*—One part of the sisal flesh, similar to that used in Example 1, is placed in an extraction vessel and the bed is treated by passing through it 10 parts of a solution of hydrochloric acid of a concentration of 1% (by weight) of commercial hydrochloric acid. This removes calcium ions and water soluble material.

After washing the bed with sufficient water to free it substantially from acid, 20 parts of 0.5% solution of sodium carbonate is passed through the bed to effect the neutralisation of the acid pectic substances to form a sodium pectate gel.

Sodium pectate gel is precipitated from the sol by the addition of a saturated solution of sodium chloride in sufficient quantity to produce approximately a 3% solution of sodium chloride. The sodium pectate gel so produced is de-watered by screening followed by further dewatering by pressing in a hydraulic press.

The pressed sodium pectate is then dried at a temperature of about 60° C. and is then ground and sieved. The yield is from 9–10%.

We claim:

1. An improved process for the extraction of pectic substances from vegetable matter consisting in first passing through a column of the vegetable matter a weak solution of an acid of a concentration not exceeding 1% by weight to replace the calcium and magnesium ions linked with the pectic substances with hydrogen ions, second washing with water the column of vegetable matter treated with said acid solution until said vegetable matter is substantially free from acid, and third treating the vegetable matter resulting from the second step with one of the group consisting of a basic alkali hydroxide, a basic alkali carbonate, a basic alkali bicarbonate, ammonium hydroxide, ammonium carbonate and ammonium bicarbonate to neutralize the insoluble pectic material and obtain a sol of a salt of the pectic substance; said three steps being carried out without agitation of the vegetable matter.

2. A process for the extraction of pectic substances from vegetable matter consisting in first treating said vegetable matter with water to remove water-soluble matter, second passing through a column of the vegetable matter a weak solution of an acid of a concentration not exceeding 1% by weight to replace the calcium and magnesium ions linked with the pectic substances with hydrogen ions, third washing with water the column of vegetable matter treated with said acid solution until said vegetable matter is substantially free from acid, and fourth treating the vegetable matter resulting from the second step with one of the group consisting of a basic alkali hydroxide, a basic alkali carbonate, a basic alkali bicarbonate, ammonium hydroxide, ammonium carbonate and ammonium bicarbonate to neutralize the insoluble pectic material and obtain a sol of a salt of the pectic substance, said three steps being carried out without agitation of the vegetable matter.

3. A process as claimed in claim 2 further characterized in that the said sol is precipitated to a gel by contacting said sol with a metal salt which forms an insoluble pectate gel, said insoluble pectate gel being then recovered from the solution by filtration.

4. A process as claimed in claim 2 further characterized in that the said sol is precipitated by contacting said sol with an acid to obtain an acid pectate gel.

5. A process as claimed in claim 2 further characterized in that the said sol is treated with a compound selected from the group consisting of alkali and ammonium salts to salt out the pectate so formed.

6. A process as claimed in claim 2 further characterized in that the said sol is precipitated by contacting said sol with a compound which forms an insoluble pectate gel and said gel is dewatered by filtration, pressing the filtered gel so obtained, drying the pressed gel, and grinding and sieving the dried gel.

CONRAD LAWRENCE WALSH.
BASIL ALBERT ADAMS.

REFERENCES CITED

The following references are of record in the file of this patent:

FOREIGN PATENTS

| Number | Country | Date |
|---|---|---|
| 474,475 | Great Britain | Nov. 2, 1937 |
| 582,147 | Great Britain | Nov. 6, 1946 |

OTHER REFERENCES

Baker et al., Food Prod. Jour. and Amer. Food Mfgr., vol. 23 (1944), pages 164, 165, 185, 3 pages.

Chem. and Eng. News, vol. 22 (1944), page 609, 1 page.

Beohner et al., Ind. and Eng. Chem., vol. 41 (March 1949), pages 450–451, 2 pages.

Perry, "Chem. Engrs. Handbook," 1941, second ed., page 1258, 1 page.